United States Patent [19]

Brownscombe

[11] 4,405,727

[45] Sep. 20, 1983

[54] REINFORCED POLYMER COMPOSITIONS AND THEIR PREPARATION

[75] Inventor: Thomas F. Brownscombe, Houston, Tex.

[73] Assignee: Shell Oil Company, Houston, Tex.

[21] Appl. No.: 296,032

[22] Filed: Aug. 25, 1981

[51] Int. Cl.³ ........................ C08K 3/34; C08L 25/04
[52] U.S. Cl. ................................. 523/205; 428/333; 428/336; 428/516; 428/517; 523/209; 524/444; 524/445; 524/449; 524/450; 524/451; 524/452; 525/903
[58] Field of Search ............. 428/333, 336, 516, 517; 523/205, 209; 525/903

[56] References Cited

U.S. PATENT DOCUMENTS

| | | | |
|---|---|---|---|
| 3,640,943 | 2/1972 | Bostick et al. | 523/209 |
| 3,686,355 | 8/1972 | Gaines et al. | 264/340 |
| 3,755,231 | 8/1973 | Muir et al. | 524/68 |
| 3,893,969 | 7/1975 | Newbould et al. | 523/209 |
| 4,017,452 | 4/1977 | Schwarz | 523/205 |
| 4,071,494 | 1/1978 | Gaylord | 523/205 |
| 4,129,549 | 12/1978 | Kahane | 523/207 |
| 4,151,136 | 4/1979 | Cornell | 523/205 |
| 4,200,565 | 4/1980 | Naughton | 523/200 |
| 4,210,572 | 7/1980 | Herman et al. | 523/200 |
| 4,251,432 | 2/1981 | Martin | 523/205 |

*Primary Examiner*—Melvyn I. Marquis
*Assistant Examiner*—Herbert J. Lilling

[57] ABSTRACT

A polymer reinforcing material, consisting of a particulate or filamentary mineral component having a thin polymer-interactive layer, averaging about 5–500 Angstrom in thickness, of silicon-free and heavy metal-free organic molecules chemically bonded to its surface by covalent bonding, when used in relatively small amounts in the range from 1 to 30 phr is capable of providing superior retention or increase of desirable polymer properties especially impact resistance, compared to the use of conventional reinforcement in the same polymer, while providing increased stiffness and retention of strength at elevated temperatures.

The reinforcing material is prepared by contacting a particulate or filamentary mineral component which has reactive sites at its surface with certain organic compounds at reaction conditions at which a covalent chemical bond is established between the mineral surface and the organic compound by reaction of a reactive site of the mineral with a site-reactive atom or group of the organic compound.

17 Claims, 3 Drawing Figures

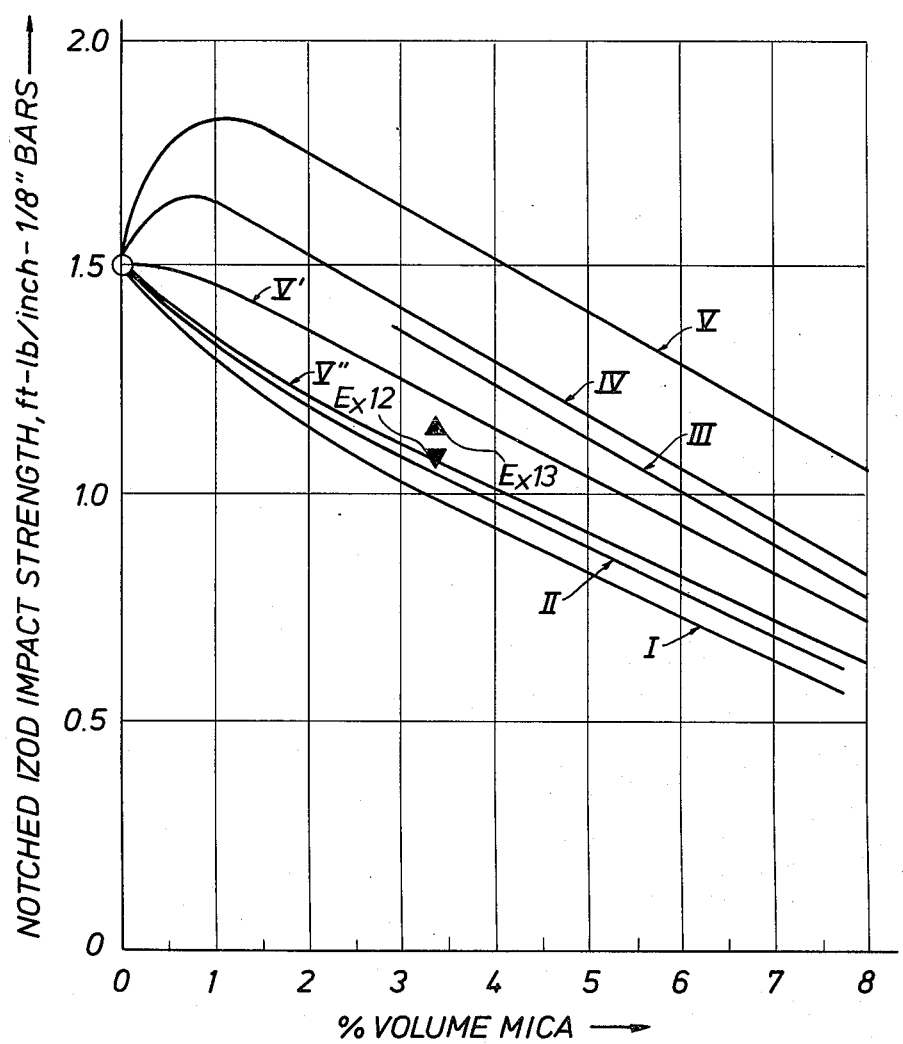
FIG.1 EFFECT OF REINFORCEMENTS ON NOTCHED IZOD IMPACT STRENGTH
| LINE | SOLID | SOLID SUBSTRATE | ORGANIC COMPOUND | SOLID PREPARED AS IN EXAMPLE NO. |
|---|---|---|---|---|
| O | - | - | - | - UNREINFORCED MATRIX |
| I | - | MICA | - | - UNTREATED MICA |
| II | A | MICA | S-B-S | 1 |
| III | B | MICA | PS | 2 |
| IV | D | MICA | B-S, TAPERED | 6 |
| V | C' | MICA | S-(SB)-B-(BS)-S | 4 |
| V' | C | MICA | S-(SB)-B-(BS)-S | 3 |
| V" | C" | MICA | S-(SB)-B-(BS)-S | 5 |

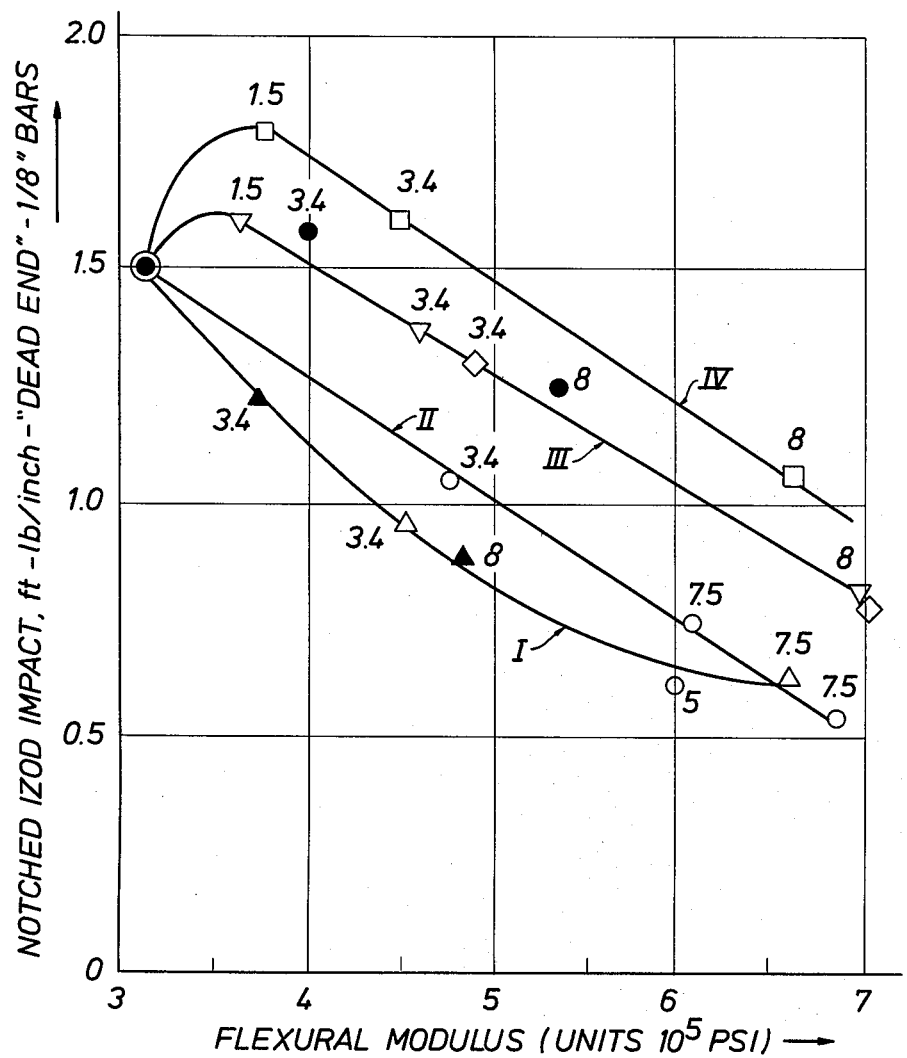

FIG. 2 IMPACT-STIFFNESS BALANCE IN HIGH IMPACT POLYSTYRENE MATRIX
NUMERALS NEXT TO DATA POINTS INDICATE VOLUME PERCENT OF REINFORCING COMPOSITION.

| | LINE | SOLID | SOLID SUBSTRATE | ORGANIC COMPOUND | SOLID PREPARED AS IN EXAMPLE NO. | |
|---|---|---|---|---|---|---|
| ◉ | - | - | - | - | - | UNREINFORCED MATRIX |
| △ | I | - | MICA | - | - | UNTREATED MICA |
| ▲ | I | - | GLASS | - | - | UNTREATED GLASS FIBER |
| ○ | II | A | MICA | S-B-S | 1 | |
| ◇ | III | B | MICA | POLYSTYRENE | 2 | |
| □ | IV | C' | MICA | S-(SB)-B-(BS)-S | 4 | |
| ▽ | III | D | MICA | B-S, TAPERED | 6 | |
| ● | III | F | GLASS | S-B-S | 8 | |

REINFORCED POLYMER COMPOSITIONS AND THEIR PREPARATION

CROSS-REFERENCE TO RELATED APPLICATIONS

The polymer reinforcing compositions utilized in this invention are described and claimed in my co-pending application Ser. No. 257,834, filed Apr. 27, 1981.

BACKGROUND OF THE INVENTION

This invention is directed to improvements in polymer compositions reinforced with particulate or filamentary mineral polymer-reinforcing agents. More particularly, this invention relates to thermoplastic polymers reinforced with chemically modified mineral reinforcing agents.

The Prior Art

Thermoplastic polymers are finding an increasing number of uses as structural materials. They are especially attractive as replacements for metals because of the reduction in weight that can often be achieved, as for example, in automotive applications. However, for any particular application, a thermoplastic polymer by itself may not offer the combination of properties desired and means to correct this deficiency are therefore of interest. In order to increase the rigidity and strength of thermoplastic polymers, it is a common practice to incorporate a quantity of filler, e.g., a natural or synthetic mineral material, in the particulate or filamentary form, e.g., as fibers or flakes. When the mixture of polymer and fibers or flakes is injection molded into a sheet form, the flow tends to cause the particles of filler to line up parallel to the sheet. If the particles have a high aspect ratio and have a high rigidity and strength, they will then consitute an effective reinforcement in the direction of alignment.

Several types of mineral fillers are in commercial use. The most frequently employed are glass fibers, asbestos fibers, clay-type minerals such as kaolin, calcium salts such as wollastonite and calcium carbonate and platy clay minerals such as talc and mica.

It is known that glass filaments must receive a chemical surface treatment or "sizing" in order to be effective as polymer reinforcement. Silicon compounds, such as polysiloxanes, are typically employed for this purpose to provide adhesion between the glass and the thermoplastic polymer. Other agents, such as "starch oil", provide lubrication; polymeric materials have been used to bind the fibers into a bundle.

In the case of normal sizing of glass fibers, the sizing compounds are not covalently bonded to the matrix. In such systems the glass fiber has a corrosion layer on the surface. This is a layer of etched glass which has had the alkali earth oxides leached out of it by water. On the surface of this corrosion layer there are islands of polysiloxanes deposited by the silane coupling agent. These islands of polysiloxanes are hydrogen bonded to the corrosion layer and not directly covalently bound to the matrix. It is well known glass laminates treated with silane sizing agents lose strength on immersion in water. This is because the water diffuses along the surface of the glass fiber through this corrosion layer, wets the corrosion layer and lubricates the interface between the polysiloxane surface coat and the glass. This again demonstrates that the siloxanes are not directly bonded to the glass.

Another common surface finish for glass fibers is a family of chromium complexes, known as volanes. These have an ionic interaction with the surface of the mineral. It is not clear whether they are in fact ionically bonded, as is claimed for them or whether they are hydrogen bonded like the silane compounds. In any event, they are not covalently bonded.

A variety of similar treatments have also been disclosed for mineral fillers other than glass fibers, especially mica and wollastonite. For example, it has been suggested to polymerize monomers such as methyl methacrylate, acrylonitrile or the like by a free radical mechanism to deposit a polymer on the mineral surface. On the basis of known reactivity of the different sorts of radicals it is expected that these polymers are not covalently bonded to the mineral surface.

Mineral fillers of the prior art, especially those other than glass fibers, must be added in large concentrations, typically as much as 40 parts by weight per hundred parts of resin (phr) or more, in order to achieve the desired increase in stiffness. Addition of such large amounts of mineral fillers causes losses in other properties of the polymers, primarily impact resistance and tensile properties, rendering such polymers unsuitable for many premium uses.

Appropriately selected reinforcing materials according to the present invention have the advantage, when used in lower concentrations from 1 to 30 phr, of producing a desired increase in stiffness of polymers without significant loss in other desired properties, and even a gain in impact strength in some cases.

SUMMARY OF THE INVENTION

This invention comprises mineral reinforced non-elastomeric thermoplastic organic polymer compositions in which novel chemically modified particulate or filamentary mineral components are used as the reinforcements. The novel aspect of the reinforcing compositions is the presence of a very thin layer of certain polymeric organic compounds bonded by covalent chemical bonding to the surface of the mineral material. The chemically modified reinforcing agents may be referred to as "polymer-bonded" reinforcements. The novel chemically modified reinforcing compositions employed in this invention and method of preparing them are described in detail in my co-pending application Ser. No. 257,834. The disclosures of said application are incorporated herein by reference.

Compositions of this invention containing relatively small amounts, in the range from 1 to 30 phr (parts by weight per 100 parts by weight of resin), of appropriately selected ones of said novel chemically modified reinforcing compositions, exhibit superior retention, or increase, of desirable polymer properties, especially impact resistance, compared to the use of conventional reinforcement in the same polymer, while providing increased stiffness and retention of strength at elevated temperatures.

The reinforced polymer compositions of this invention are generally superior to similar polymers reinforced with polymer-coated mineral fillers or reinforcements prepared by precipitating a polymer onto a mineral surface without chemical bonding of the polymer to the surface. They are also superior to compositions prepared by suspending the filler or reinforcement in a liquid in which a monomer is undergoing polymerization.

BRIEF DESCRIPTION OF THE DRAWING

FIG. 1 of the drawing illustrates the relation of impact strength to amount of different reinforcing composition.

FIG. 2 of the drawing illustrates the relation of impact to stiffness properties for several reinforced compositions.

DESCRIPTION OF THE PREFERRED EMBODIMENTS

Figure 3:
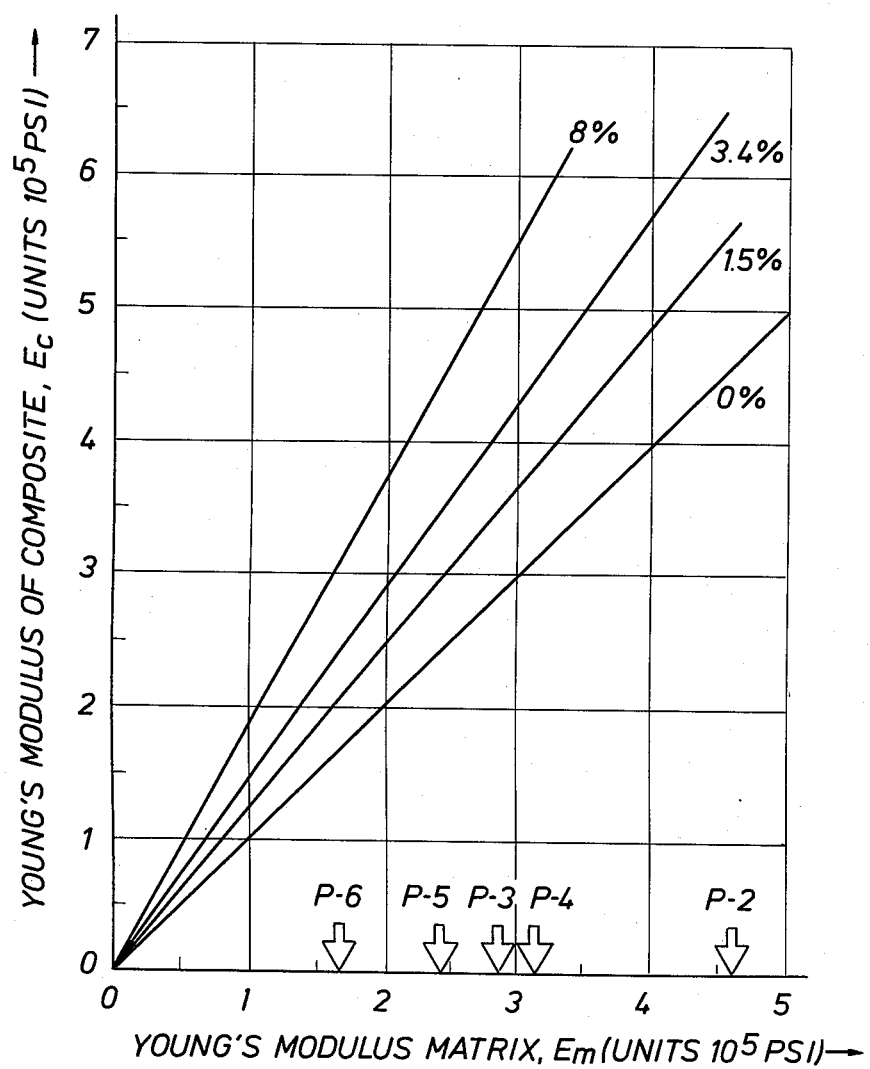
FIG. 3 of the drawing illustrates the relation of Flexural modulus of reinforced composites to matrix modulus.
Figure 3:
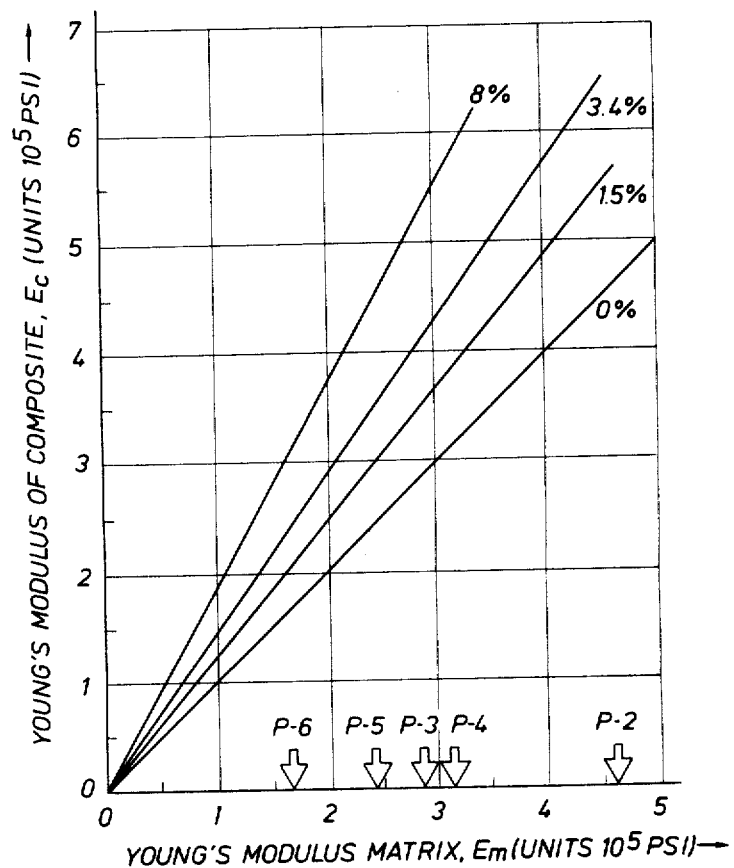

The polymer reinforcing materials employed in this invention consist of a mineral substrate and a polymer-interactive layer which is bound to the substrate by covalent chemical bonding and is produced by chemical reaction of the substrate with a site-reactive organic compound which has a polymer-interactive group.

The mineral substrates include the particulate or filamentary mineral materials which are known in the prior art as suitable for reinforcing organic polymer compositions, provided they have surface sites which are capable of covalent chemical bonding to a constituent of an organic molecule. Alternatively, a mineral material may be treated with a reagent which introduces reactive surface sites into the mineral surface.

The most common and generally preferred mineral reinforcing materials contain or consist of silicates or aluminosilicates and have as reactive sites on the surface oxygen atoms or hydroxyl groups.

The group of suitable reinforcing materials includes: glasses; silicates; aluminosilicates, including mica, talc, clays (preferably bentonite or kaolin), vermiculite and asbestos; calcium silicates, suitable wollastonite; silica and alumina.

Particulate substrates may be naturally occurring or manufactured particles of various shapes. Particulate or filamentary substrates of any aspect ratio or geometry may be used. Especially suitable and preferred for polymer reinforcement to improve strength and stiffness or hardness are platy particles such as mica and vermiculite. Preferred dimensions for such platy reinforcements are 100 to 1000 microns in length and width and 1 to 6 microns in thickness. Especially preferred for improvement of strength and stiffness of the reinforced polymers are platy reinforcements of high aspect ratio, in the range from 20 to 200.

Filamentary substrates may be standard glass fibers, chopped or continuous or milled; or naturally fibrous minerals, such as asbestos. Conventional chopped glass fibers typically are 2 to 15 millimeters in length before use and 0.3 to 4 millimeters after they are compounded in a polymer matrix. Aspect ratios may be as low as 10.

The polymer interactive layer of the polymer reinforcing materials used in this invention is created by chemical reaction between the mineral substrate and certain organic compounds.

The molecules of the organic compounds employed in producing the bonded surface layer of said reinforcing compositions are characterized by two essential component parts. One component part is a segment of substantial length, referred to herein as the "polymer-interacting" segment, which, when the polymer-bonded mineral particle or filament is present in a polymer melt, is capable of interacting with the polymer, due to the segment's length and similarity of structure to the polymer, as if the segment were part of the polymer. The second characterizing component is an atom or group, referred to herein as the "site-reactive" segment, which is capable of reacting with a reactive site on the surface of the mineral material to result in a covalent chemical bond between the mineral surface and the organic compound. The mineral compositions which result from covalent bonding of such compounds to a mineral surface may be referred to as polymer-interacting reinforcements. The organic compounds employed in preparing the reinforcing compositions do not contain silicon or chromium—or other metals of Groups II-VIII of the Periodic Table—as a substituent, and are therefore referred to as "silicon-free" and "heavy metal-free".

The polymer-interacting component of the organic compound must be one which will interact appropriately with the polymer matrix which is to be reinforced. The appropriate interaction is one which produces adhesion between the reinforcement and the polymer matrix, and most especially, it is the strong adhesion produced by the entanglement of polymer chains in the polymer-interacting group with similar polymer chains in the polymer matrix. For example, grafting of high molecular weight polypropylene to the surface of the filler provides the result that when the treated filler is processed with lower molecular weight polypropylene, the polypropylene grafted to the filler entangles the polypropylene of the matrix, forming a bond as strong as the tensile strength of the polypropylene matrix between the filler and the matrix. A more dissimilar polymer, such as polyethylene, may be used for the graft and will still result in interaction with the polypropylene due to wetting and polar or non-polar interactions of the two polymers, the one of the matrix and the one bound to the surface of the mineral.

The general subject of polymer compatibility, or molecular solution or entanglement, has been extensively treated by various authors, as, for example, in the two-volume publication *Polymer Blends*, edited by D. R. Paul and Seymour Newman, Academic Press, New York, N.Y., 1978. A normal test of polymer compatibility involves mixing two polymers intimately by melt or solution mixing and observing whether the glass transitions of each are preserved or the material exhibits only one coalasced glass transition. In the latter case, the polymers are compatible; that is, they are molecularly mixed. Such molecular mixing between the grafted polymer and the polymer matrix is a sufficient but not a necessary condition for the practice of this invention. Our data establish that benefits in properties of the composite result even from the lesser interactions exhibited by incompatible polymers such as S-B-S thermoplastic elastomers and polypropylene.

Thus, any pair of compatible copolymers is suitable for use as matrix and polymer interactive segment according to this invention. Most desirably, the number average molecular weight of the polymer-interactive segment is at least about one-sixth, and suitably at least about half that of the matrix polymer. For various classes of materials such as "polar" or "non-polar", "saturated" or "unsaturated" polymers, two polymers taken out of the same single group of the above-quoted groups are likely to be suitable as matrix and polymer interactive materials as well.

It has been found especially useful to employ as the polymer-interactive component suitable for reinforcing hydrocarbon polymer matrices one of several types of hydrocarbon block copolymers. These compositions are well known thermoplastic elastomers, many of them commercially available, and are described, i.a., in numerous patents. One group of such polymers consists of linear block copolymers having polystyrene end blocks and polybutadiene or polyisoprene center blocks and the products obtained by partial hydrogenation of such copolymers to produce polymers having primarily polystyrene end blocks and hydrogenated polybutadiene center blocks. Reference for the preparation and compositions of such polymers may be made to U.S. Pat. No. Re. 28,236 and U.S. Pat. Nos. 3,595,942, 3,810,957, 4,208,315 and 4,242,470. As explained therein, polystyrene-polybutadiene-polystyrene and polystyrene-polyisoprene-polystyrene block copolymers may be abbreviated "S-B-S" and "S-I-S", respectively, and their derivatives in which the center block is hydrogenated may be designated "S-EB-S" and "S-EP-S", respectively. Molecular weights of the blocks in the ranges disclosed in said patents tend to be useful in this invention. Another related block copolymer is of the type S-(SB)-B-(BS)-S, which is disclosed in U.S. Pat. Nos. 3,906,057, 3,906,058, 3,907,929 and 3,907,931. In this case, (SB) and (BS) refers to so-called "tapered" polymer structure, which consists of molecules or blocks in which at one end there is a chain of essentially only one type of monomer and units of the other monomer are present at increasingly greater frequency until at the other end of the block or molecule there is a random distribution of the two monomers. Still another type of useful block copolymer is a tapered two-block polymer having, for example, about 30% styrene and 70% butadiene content, the polybutadiene component having about 10% vinyl structure.

The relevant disclosures of the above referred to patents are incorporated herein by reference.

Various thermoplastic polymers can be reinforced in accordance with the present invention. Thermoplastic polymers contemplated herein are non-elastomeric materials including, without limitation: styrene-based polymers, copolymers, and graft copolymers; olefin-based polymers and copolymer; nylons; poly(ethylene terephthalate); poly(butylene terephthalate); acrylonitrile-butadiene-styrene terpolymers; polyketones; poly(phenoxy); poly(aryl ether); poly(aryl ester); and polyurethane.

The following represents appropriate choices of polymer-interacting segments for given polymer matrices.

| Matrix | Polymer-interacting segment of the chemically modified mineral |
|---|---|
| Polyolefin e.g., polyethylene, polypropylene, poly-1-butene, etc., especially isotactic homo- and copolymers, including so-called block copolymers. | Polyolefin e.g., linear polyethylene, polypropylene, etc., including plastic or elastomeric random and block copolymers. The monomer need not be identical to that of the matrix polymer, so long as the segment is capable of being dispersed in the matrix polymer in melt form. |
| Poly(vinyl arene) homopolymers and copolymers; e.g., polystyrene; ABS, SAN, etc. | Block polymers A-B or A-B-A where B is a polydiolefin, e.g., polybutadiene or polyisoprene and A is a poly(vinyl arene), e.g., polystyrene; poly(vinyl arene) homopolymers and copolymers; e.g., polystyrene, ABS, SAN, etc. |
| Polyesters e.g., polybutylene terephthalate (PBT), polyethylene terephthalate (PET) | PBT or PET |
| Poly(phenoxy) | Polyphenoxy |
| Poly(aryl ether) | Poly(aryl ether) Polyaryl, e.g., polystyrene |
| Nylons | Polyamide; polyurethane |
| Polyurethane | Polyurethane; polyamide; molecules containing groups capable of grafting reacting with polyurethane, e.g., epoxy or —NH$_2$. |

A preferred combination comprises hydrocarbon polymers reinforced with compositions in which the polymer-interacting segment is a hydrocarbon, resulting from use of a hydrocarbon polymer in the preparation of the reinforcing mineral composition.

Preparation of the Polymer Reinforcing Materials

The mineral compositions having a thin polymer-interacting layer bonded to the surface by covalent bonds, which are employed in the reinforced polymer compositions of this invention, are prepared by contacting a particulate or filamentary mineral component which has reactive sites at its surface with a polymer-interactive, site-reactive organic compound at reaction conditions at which a covalent chemical bond is established between the mineral surface and the organic compound by reaction of a reactive surface site of the mineral with a site-reactive atom or group of the organic compound.

Various methods, described in detail in my co-pending application Ser. No. 257,834, may be employed to prepare the reinforcing compositions used in this invention. A first mode of preparation involves the acid catalyzed reaction of an olefinic double bond contained in a polymer with a mineral surface. A second mode comprises nucleophilic attack of a mineral substrate on a polymer which contains a group labile to nucleophilic attack. A third mode comprises a nucleophilic attack by a polymeric material on a susceptible bond in a mineral reinforcement. The following summarizes preferred methods illustrating each of these modes.

In the first mode, mineral material which has reactive oxygen at its surface is brought into contact with an organic compound which has as the site-reactive group at least one olefinic double bond per molecule under reaction conditions at which the double bonds of the organic molecule or active oxygen on the mineral surface or both are protonated, whereby a covalent chemical bond is established between the mineral surface and the organic molecule.

In the second mode, mineral material which has reactive oxygen at its surface is brought into contact with an organic compound which has, as the site-reactive group, a substituent atom or group which is capable of nucleophilic displacement by reactive oxygen under reaction conditions at which at least one such substituent group or atom is displaced by an oxygen atom from the mineral surface, thus creating a covalent chemical bond between the surface and the organic molecule.

In the third mode, reactive sites consisting of groups capable of nucleophilic displacement are created on the surface of mineral material by reacting the mineral with a reagent which creates a "leaving group" or by drying at an elevated temperature, and the modified mineral material is contacted with an organic compound which has a nucleophilic group on the site-reactive group at reaction conditions at which a covalent bond is established between the mineral surface and the organic compound.

As shown in the illustrative examples, the fully-prepared reinforcing solids were generally given multiple washes with a hydrocarbon solvent, typically the same as that in which the product had been prepared. Such washes are desirable in a study of the methods of preparation, since they remove non-grafted polymeric material. However, such removal of non-grafted material by means of solvent washes is not essential to practice of the invention.

The use of any of the reactions outlined in modes 1, 2, or 3 will automatically produce a layer which characteristically, as evaluated by electron spectroscopy for a chemical analysis (ESCA) will be in the range of about 5 to 500 Angstroms, in thickness, and typically between 10 and 100 Angstroms in thickness. The cause of this self-limiting thickness is not known with certainty. It is believed that it may be due to saturation of the surface reactive sites on the mineral with site interactive groups on the polymer, leaving a mineral surface covered with the polymer interactive tails and the site interactive materials in such a way that it is impossible for further attack on the surface to occur. Not every site on the mineral, therefore, may be reacted and the polymer interactive chains left on the surface will not be interactive with the site reactive groups left in solution.

Determination of thickness of polymer interactive layers on reinforcement substrates The technique used to analyze the surface layers discussed in this application was X-ray photoelectron spectroscopy (XPS), also known as "Electron Spectroscopy for Chemical Analysis" (ESCA). In this technique, a material is bombarded with X-rays which eject photoelectrons from the core levels of the atoms in the substrate material. The energy of these electrons is determined by the energy levels of the electrons in the various atoms and the distribution of electrons of various energies is determined by the numbers of different types of atoms present and the response of each of the various electrons in the atom to that particular type of X-ray. It is well known that the response factors of the various elements may be tabulated and elemental analysis may be performed on surfaces by using this equipment. The various types of reinforcements described in this patent application have been analyzed by ESCA. By comparing the ESCA results obtained on (1) an untreated substrate, (2) a substrate after treatment, as described in the examples, to react it with an organic molecule; and (3) a substrate after such treatment, followed by contact with solvents under conditions at which coatings which are not chemically bound would be removed, it has been determined that the elements of the polymer interactive materials are incorporated on the surfaces of the reinforcement materials by chemical bonding—that is, in such a way that they cannot be washed off or extracted by appropriate solvents. In addition to this determination, the thickness of these layers has been estimated by comparing the relative attenuations of two different electrons from the same element. The apparent layer thicknesses determined by this technique are not necessarily accurate but permit comparison of the thickness of organic coatings on an inorganic substrate in different samples, provided that the organic coating is uniformly distributed in a film of constant thickness and that the element being used for the analysis is uniformly distributed in the inorganic substrate. Based on these assumptions, the data observed for any polymer interactive grafted layers are reproducible, although it cannot be said with certainty what the exact thickness is. Thus, it is possible that the layers cited as being 20 Angstroms might indeed be 40 or 50 Angstroms.

The range of 5–500 Angstroms, which is disclosed herein as being the average thickness of the co-valently bound organic molecules, is thought to be sufficiently broad to take account of this lack of precision in measurement. In any event, it contrasts with a thickness of the order of about one-half micron (5000 Angstroms) characteristic of coatings such as applied by precipitation from solution or conventional silane sizings.

Another method of employing ESCA for approximate determination of layer thickness is by determination of the ratio of the various surface atoms. For example, one can compare the amount of carbon on the surface with the amount of silicon on the surface to get an approximation of the amount of hydrocarbon polymer deposited on a silicon-containing mineral. In many cases, this and the previously described technique, once calibrated to agree at an initial point, were found to agree over a wide range of materials. In some cases there was some variance between the results of the two methods. The reported value is an average of the two techniques.

Preparation of the Reinforced Polymer Composites

Polymer compositions reinforced with the above-described chemically modified mineral materials may be prepared by methods known for the production of mineral-filled thermoplastics. A major difference, however, is that according to this invention the mineral reinforcements are present in much lower concentrations, in the range from 1–30 phr, and especially in concentrations not exceeding 20 phr, and preferably 3 to 20 phr, compared to conventional filled thermoplastics which typically contain 40 phr or more of filler.

The filled composition may be prepared, for example, by mixing the desired amount of reinforcing material with particulate polymer and submitting the mixture to conditions at which the modified mineral is incorporated in the polymer, e.g., by compounding the mixture by means of a melt-mixing device, such as an extruder or Banbury compounder, either for direct use, as in injection molding or extrusion of sheet or other desired profiles, or for pelletizing to provide a salable reinforced resin. Because of the improved adhesion of these fillers to the polymer matrix, it is desirable to avoid conditions during blending of the fillers with the polymer which result in excessive attrition or fragmentation of these fillers.

The invention is further illustrated by the following examples. These are given for the purpose of illustration only and are not meant to limit the invention to the particular reactants and conditions employed therein.

The following materials were employed in a number of the examples and are therefore referred to by an abbreviated designation for ease of reference.

Substrates
| | |
|---|---|
| M-1 | Phlogopite Mica (nominally 60 mesh)-Sieve analysis in Table 1 |
| M-2 | Phlogopite Mica (nominally 200 mesh)-Sieve analysis in Table 1 |
| M-3 | Phlogopite Mica (nominally 320 mesh)-Sieve analysis in Table 1 |
| M-4 | Glass Fibers - "E-Glass" ⅛ inch long, 13 micron diameter |

Organic Compounds
| | |
|---|---|
| O-1 | S-B-S Block Copolymer - Commercial polymer; nominal styrene:rubber weight ratio = 30:70 |
| O-2 | S-EB-S Block Copolymer - Commercial polymer; nominal styrene:rubber weight ratio = 29:71 |
| O-3 | B-S "Tapered" Two-Block Copolymer - Commercial polymer; nominal styrene:rubber weight ratio = 29:71 |
| O-4 | S-(SB)-B-(BS)-S Block Copolymer - Nominal molecular weights of the blocks ($\times 10^{-3}$) = 67-30-260-30-67 |
| O-5 | Polystyrene - Commercial crystal grade - melt flow range 2-3 |
| O-6 | Polypropylene - Commercial product - nominal melt flow 5 |
| O-7 | "Living Polymer" of lithium-terminated polystyrene; nominal molecular weight 30,000 |

Catalysts, Acid Acceptors and Chemical Reagents
| | |
|---|---|
| C-1 | Triflic Acid (Trifluoromethane sulfonic acid) |
| C-2 | p-Toluene sulfonic acid |
| C-3 | Bromine |
| C-4 | Thionyl chloride |

Solvents
| | |
|---|---|
| S-1 | Toluene |
| S-2 | Cyclohexane |
| S-3 | Bromobenzene |
| S-4 | Benzene |

Polymer matrices (Relevant Properties in Table 2)
| | |
|---|---|
| P-1 | Polypropylene - commercial polymer - nominal melt flow 5 |
| P-2 | Polystyrene - commercial crystal grade - melt flow range 2-3 |
| P-3 | High Impact Polystyrene - blend of organic compound O-4 in polystyrene - melt flow range 2-3 |
| P-4 | Commercial High Impact Polystyrene - blend of polybutadiene in polystyrene - melt flow range 3-4 |
| P-5 | Blend of 15% of organic compound O-1 in 85% of Matrix P-4 |
| P-6 | Blend of 30% of organic compound O-1 in 70% of Matrix P-4 |

TABLE 1
SIEVE ANALYSIS OF MICA SUBSTRATE
Hammer-milled Phlogopite Mica

| Mesh | Weight % Retained on Sieve Substrate No. | | |
|---|---|---|---|
| | M-1 | M-2 | M-3 |
| +50 | 21.1% | | |
| +70 | 29.2% | | |
| +100 | 27.3% | | |
| +140 | 9.05% | 18.45% | 1.95% |
| +200 | 2.0% | 20.00% | 8.75% |
| +325 | 0.85% | 23.10% | 34.75% |
| +400 | | 5.60% | 36.45% |
| +20 Microns | | | 15.8% |
| +20 Fines | 0.5% | 32.85% | 2.8% |
| Aspect Ratio | 63 | 60-70 | 20-30 |

TABLE 2
PROPERTIES OF MATRICES

| Matrix | Test Temp. °C. | Flexural Modulus (Units $10^5$ psi) | Yield Stress psi, .0018 min.$^{-1}$ | % Elongation | Notched Izod, 75° F. Ft-Lbs/inch | | Ratio R |
|---|---|---|---|---|---|---|---|
| | | | | | Gate | End | |
| P-1 | 25 | 1.9 | 3700 | | 0.42 | | |
| P-2 | 27 | 4.6 | 5550 | 1.25 | 0.2 | .2 | 1 |
| P-3 | 19 | 2.87 | 2984 | 29 | 8.37 | 6.34 | 1.32 |
| P-4 | 19 | 3.13 | 2780 | 25 | 3.1 | 1.5 | 2.10 |
| P-5 | 19 | 2.41 | 2292 | 34 | 5.87 | 3.52 | 1.67 |
| P-6 | 25 | 1.67 | 1530 | 49 | 9.84 | 8.61 | 1.14 |

PREPARATION OF REINFORCING SOLIDS

EXAMPLE 1

| Starting Materials | | Product |
|---|---|---|
| Mineral Substrate | M-1 Mica | Solid A |
| Organic Compound | O-1 S-B-S | |
| Catalyst | C-1 Triflic Acid | |
| Solvent | S-1 Toluene | |

141.1 g of block copolymer O-1 was charged with 3100 cc dried industrial grade toluene (S-1), to a 4 liter resin kettle, stirred under nitrogen, and warmed to dissolve the block copolymer. 1022.7 g of as received mica M-1, dried in a vacuum oven for 2½ hours, was poured into the resin kettle under moisture-free conditions. The hot mixture was stirred under nitrogen at about 80°-100° C. for one hour. Two cc of acid catalyst C-1 was added to 30 cc toluene in a dry box and shaken to mix, forming a cloudy, yellowish solution. Fifteen cc of the solution was injected with a syringe into the hot stirred mica suspension. The mica suspension was stirred for 20 minutes and the last 15 cc of catalyst solution injected. The mixture was refluxed for 1 hour at atmospheric pressure and about 111° C. 1.8 liters liquid was sucked off of the mica through a 100-mesh screen. Two liters fresh toluene was added, the suspension stirred and left overnight under nitrogen flow. The following day, 1.3 liters toluene was sucked off, 2 liters fresh toluene added, the suspension stirred, 2 liters toluene sucked off, and this washing procedure repeated two more times. The mica was sucked dry, transferred to a vacuum oven, left overnight at 30" of mercury vacuum at 50° C. The following morning the mica was completely dry. The mica was passed through a No. 10 screen with a rubber stopper to disperse the clumps which formed in the bottom of the evaporating crystallizing dish. 1 kg mica was recovered.

EXAMPLE 2

| Starting Materials | | Product |
|---|---|---|
| Mineral Substrate | M-1 Mica | Solid B |
| Organic Compound | O-5 Polystyrene | |
| Catalyst | C-1 Triflic Acid | |
| Solvent | S-1 Toluene | |

In a 4 liter resin kettle, 100 g of crystal polystyrene (O-5) in 3100 cc dried toluene (S-1) was stirred and warmed under nitrogen to dissolve the polystyrene. Two cc of acid catalyst C-1 in 60 cc dry toluene was added slowly to the warm polystyrene solution under nitrogen, turning the solution pale yellow. 1005 g of mica (M-1), dried in a vacuum oven, was immediately added to the stirred acid mixture under moisture-free conditions. The mixture was stirred for 30 minutes with warming and a second solution of 2 cc C-1 and 60 cc toluene added. The mixture was brought to reflux for an hour and filtered hot with a 16 mesh filter. The resulting suspension was washed several times with toluene, as in Example 1. The resultant mica looked exactly as received mica—it appeared very dry, no adhesion noted between flakes.

EXAMPLE 3

| Starting Materials | | Product |
|---|---|---|
| Mineral Substrate | M-2 Mica | Solid C |
| Organic Compound | O-4 S-(SB)-B-(BS)-S | |
| Catalyst | C-1 Triflic Acid | |
| Solvent | S-1 Toluene | |

50 g of block copolymer O-4 was dissolved in 300 ml toluene (S-1) in a 4 liter resin kettle. 5 cc of acid catalyst C-1 was dissolved in 150 ml toluene in a dry box. The solution of polymer together with 1000 g of dry mica M-2 and the catalyst solution was charged into the resin kettle. The mixture was refluxed 2 hours and let cool overnight under nitrogen blanket. The mica was washed several times with toluene. After washing, the mica was air dried on a filter funnel and vacuum dried in the oven at 30" mercury overnight, and passed through a 50 mesh screen.

EXAMPLES 4–8

The following solids are prepared similarly to the method of Example 1.

| | STARTING MATERIALS | | | | | |
|---|---|---|---|---|---|---|
| Example | Mineral | Substrate | Organic Compound | Catalyst | Solvent | PRODUCT |
| 4 | Mica | M-1 | Block Copolymer O-4 | Acid C-1 | S-1 | Solid C' |
| 5 | Mica | M-3 | Block Copolymer O-4 | Acid C-1 | S-1 | Solid C" |
| 6 | Mica | M-1 | Block Copolymer O-3 | Acid C-1 | S-1 | Solid D |
| 7 | Mica | M-1 | Block Copolymer O-1 | Acid C-2 | S-1 | Solid E |
| 8 | Glass | M-4 | Block Copolymer O-1 | Acid C-1 | S-1 | Solid F |

EXAMPLE 9

| Starting Materials | | Product |
|---|---|---|
| Mineral Substrate | M-1 Mica | Solid G |
| Organic Compound | O-6 polypropylene | |
| Reagent | C-3 Bromine | |
| Solvents | S-3 and S-4 | |

| Starting Materials | Product |
|---|---|
| Bromobenzene and Benzene | |

A 250 ml round bottom flask fitted with heating mantle, nitrogen blanket and reflux condenser was charged with 100 ml of bromobenzene and 5.0 grams of polypropylene. The mixture was heated, and stirred with a Teflon stir bar. After 3 hours most of the polypropylene appeared to have dissolved; the skin temperature of the heating mantel was 180° C. At this point 100 ml of hot benzene was added to dilute the bromobenzene. 0.5 grams of bromine was added to the solution, which turned red-orange, making the undissolved polypropylene clearly visible. The reaction was carried out under fluorescent lights, since the bromination of polypropylene is activated by light. The solution was poured into a 4 liter nitrogen flushed resin kettle preheated to 100° C., through a 100 mesh screen which sieved out 0.19 grams of undissolved polypropylene. 3.1 liters of hot benzene was added to the solution, which was now yellow. Four microdrops of bromine, totaling 0.15 grams, were added and the solution turned orange. The reinforcement material to be grafted was then suspended to the resin kettle and the mixture stirred under reflux for a period of 30 minutes to 4 hours. The reinforcement material was then removed from the liquid and washed with 150 ml of hot bromobenzene, followed by 4 washes with 300 ml of hot benzene. The material was then sucked dry on a filter and allowed to dry in a stream of nitrogen overnight.

ESCA studies of mica treated substantially as in the described preparation confirmed the presence of a polymeric layer which could not be removed by extraction with benzene or bromobenzene in a Soxhlet extractor.

EXAMPLE 10

A polymer reinforcing composite particularly suitable for use in reinforcing thermoplastic phenoxy resins, i.e., resins having chains of groups of the structure

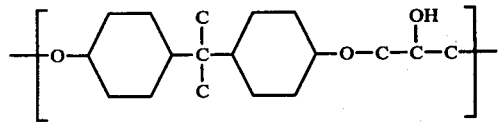

which may be terminated with epoxy groups and have molecular weights of the order of 40,000, may be prepared as follows:

A polyepoxide resin such as a higher molecular weight solid epoxy resin produced from epichlorohydrin and 2,2-bis(4-hydroxyphenyl)propane (Bisphenol A) is dissolved in a suitable solvent, such as a ketone, and permitted to reach with a solid substrate such as mica or glass, typically at temperatures between 50° to 150° C., depending on the solvent used. The resulting solid is thereafter recovered, washed with fresh portions of the reaction solvent and dried.

EXAMPLE 11

| Pretreatment of Substrate | | |
|---|---|---|
| | Starting Materials | Product |
| Mineral Substrate | M-1 Mica | Solid H-1 |
| Reagent | C-4 Thionyl chloride | |
| Solvent | S-1 Toluene | |

A 4 liter resin kettle, dried and flushed with nitrogen, was charged with 2 liters of toluene dried over a molecular sieve. 500 grams of mica M-1, dried overnight in a vacuum oven at 30 inches of mercury and 120° C., was charged to the toluene. A solution of 20 grams of thionyl chloride (168 mmoles) in 12 ml of dried toluene was made up in a dry box. This solution was added dropwise to the rapidly stirred mica suspension over a period of 30 minutes. After the addition was finished, the resin kettle was heated for a period of 40 minutes, at which point the color in a trap with acid indicator, fitted to the exit nitrogen line, had faded, indicating that the theoretical amount of HCl had been evolved by the reaction of the thionyl chloride with the hydroxyl groups on the surface of the mica. The final temperature of the skin of the kettle was 137° C. The mixture was then refluxed for 2 hours, a distillation head was attached and excess thionyl chloride and toluene were distilled off of the mica. The mica was then heated over a period of 2½ hours at 200° C. with nitrogen admitted to the bottom of the mass through a stainless steel tube to completely dry the mica and evolve the vapors resulting from decomposition of the SOCl moieties on the surface of the mica. The mica was then divided into 3 150 g. samples and stored under nitrogen in wide mouth bottles.

| Preparation of Reinforcement from Pretreated Substrate | | |
|---|---|---|
| | Starting Materials | Product |
| Mineral Substrate (pretreated) | Solid H-1 | Solid H |
| Organic Compound | O-13 Lithium-terminated polystyrene | |
| Solvent | S-2 Cyclohexane | |

150 g of mica, treated with thionyl chloride as described, was removed from the dry box and moistened with 186 g of dried cyclohexane in a 500 cc round bottom flask, stoppered with a serum cap. 216.2 g of a living polymer cement containing 9.63% solids (O-13), which was a living polystyrene polymer of 28,000 to 32,000 (nominal 30,000) molecular weight, dissolved in cyclohexane, was added through the serum cap to the mica in the flask. The red color of the living cement was immediately quenched by reaction with the mica, indicating that the grafting reaction appeared to be quickly complete at room temperature. The mixture was heated for 2½ hours at 60°-70° C. with occasional mixing to be certain the reaction was complete. A condenser was attached to the flask, which was swept with a dry nitrogen purge and refluxed for 2 hours after the initial 2½ hour reaction. The next day the solution was decanted from the mica, which was washed repeatedly with cyclohexane in 500 ml quantities and washed 3 times with 500 ml quantitites of toluene. ESCA analysis showed no change in the polymeric coating on further washing with toluene or cyclohexane or extraction in a Soxhlet extractor.

Application of Coating Layer To Minerals Having Covalently Attached Polymer Reactive Surface Layer Chemically modified mineral substrates can be coated with a further polymer layer and this new product used to advantage as polymer reinforcement. The resulting products and their preparation and use are the subject of separate, copending patent applications. This separate use of the compositions of this invention is illustrated in the following examples 12-15.

EXAMPLE 12

| Starting Materials | | Product |
|---|---|---|
| Solid | Solid A | Solid I |
| Organic Compound | O-1 S-B-S | |
| Solvent | S-1 Toluene | |

In a 2 liter beaker, 40 g of block copolymer O-1 was dissolved in 1200 ml toluene with heating and stirring. 401.8 g of Solid A, prepared according to Example 1, was stirred into the solution for 5 minutes. The mixture was placed in a vacuum oven and evacuated very slowly to dryness with periodic mixing. The resulting solid contained about 10 percent by weight of the S-B-S polymer as a coating on the starting solid.

EXAMPLE 13

| Starting Materials | | Product |
|---|---|---|
| Solid | Solid A | Solid J |
| Organic Compound | O-1 S-B-S | |
| Solvent | S-1 Toluene | |

The preparation of Example 12 is repeated with half the proportion of Solid A, to produce a reinforcing material coated with about 20% by weight of S-B-S copolymer.

EXAMPLE 14

| Starting Materials | | Product |
|---|---|---|
| Solid | Solid C | Solid K |
| Organic Compound | O-1 | |

EXAMPLE 15

| Starting Materials | | Product |
|---|---|---|
| Solid | Solid C | Solid L |
| Organic Compound | O-4 | |

In 2 liter battery jars, 250 g of Solid C, prepared according to Example 3, was charged with 500 cc toluene and 25 g of block copolymer O-1 and O-4, respectively. The mixtures were stirred over a hot plate until the polymer dissolved and the suspensions were well mixed. The suspensions were placed in a vacuum oven and dried overnight at 50° C. The procedure resulted in solids coated with 10% by weight of S-B-S and of S-(SB)-B-(BS)-S block copolymers, respectively, over a co-valently bound thin layer of S-(SB)-B-(BS)-S.

Effectiveness of Mineral Composition of the Invention in Reinforcing Polymers

EXAMPLE 16

Mineral reinforcements prepared as above were employed in reinforcement of polymers and the resulting solids tested for impact and stiffness properties.

500 grams batches of filled composition of polymer matrix and treated mineral substrate were prepared as follows:

The components—e.g., treated mica flake and polystyrene beads—were mixed by shaking and tumbling for a few minutes in a two-quart glass jar. Melt mixing was carried out using a single screw extruder operated under the following conditions:

Brabender Extruder

Dimension of Screw—25"×1"
Temperature—210° C.
Screw RPM—90

Extrudate was solidified on a Teflon coated aluminum sheet and subsequently chopped into beads. Extrusion was repeated a second time and extrudate again was chopped into beads.

The 500 gram batch of beads then was injection molded into test bars, using the following machine settings:

Battenfeld Injection Molding

Temperature—465° F.
Injection Pressure—950 psi
Clamping Pressure—1800 psi
Back Pressure (feed)—250 psi
Mold Temperature—100° F. Each molding cycle produced one tensile test bar, two Izod impact test bars, and a circular disk. The tensile test bar was used to measure flexural modulus; the same bar was used for the tensile test. The two Izod test bars were used to measure notched Izod impact strength for two mold positions, viz., near the "gate" and near the "dead" end. Tests were performed in the temperature range 22±2° C. A description of test methods is given in the following section.

Test Methods and Evaluation

Three mechanical property tests were performed: (i) notched bar Izod impact test, (ii) three point bend test, and (iii) uniaxial tensile test.

The notched Izod test was carried out according to ASTM specification D-256-A-73 at an ambient temperature of 22±2° C. using ⅛ inch thick test bars.

Flexural modulus was determined using a three point bend testing fixture with a 2.00 inch span between load reaction points. A load of a magnitude such that the maximum tensile bend stress would remain below 1500 psi, according to the formula:

$$\sigma_{max} = \frac{2}{3} \frac{P \times L}{w \times t^2}$$

where
$\sigma_{max}$ = maximum tensile bend stress
P = applied load
L = span between load reaction points
t = specimen thickness
w = specimen width.

The selected load was slowly applied and maintained for one minute, which permitted some inelastic strain relaxation to take place and for the deflection to reach a steady, reproducible value. The flexural modulus was calculated using the elementary bending formula for a simple beam subject to three point bending.

Tensile tests were performed using a model TTC Instron testing machine and a microformer extensionmeter (Baldwin) attached to the gage section of the standard injection molded tensile test bar. The total length of the straight portion of the gage section was 2.75 inches. The nominal cross sectional dimensions were ⅛ inch × ½ inch. Thin strips of adhesive tape were introduced between the surface of the specimen and the knife edges of the extensiometer to prevent failure from indentation stresses. Extensiometer sensitivity was a chart motion of 2 inches for a strain of 1%. The crosshead motion was set at 0.005 inches/minute corresponding to a strain rate of 0.0018 minute$^{-1}$ at the gage section. Yield stress and % elongation to fracture were obtained from the tensile test.

The effect of various reinforcements on improving the stiffness of the reinforced composites was evaluated by means of the following equation:

$$E_c = F\, E_m$$

where:
$E_c$ = Young's modulus of the composite
$E_m$ = Young's modulus of the matrix polymer.

The function F is a constant for a homologous series of composites in which the aspect ratio, dispersion and volume fraction of the reinforcement are the same, but the polymer matrix and the surface treatment of the reinforcement may vary. Plotting the ratio $E_c$ versus $E_m$ for a series of composites using, in each case, a single reinforcing solid prepared as above in different polymer matrices, showed that within this series data for composite subgroups which have the same volume fraction lie on straight lines through the origin. The slopes of the lines increase with volume fraction. This is determined primarily by the function F; this slope also can depend on surface chemical treatment as well as effectiveness of dispersion.

Plots of $E_c/E_m$ were prepared for six chemically treated reinforcements. To characterize the effect of chemical treatments on flexural modulus, a master plot of $E_c/E_m$ versus volume fraction mica was constructed. Points on this plot were taken from the average straight lines of previous plots, of $E_c$ versus $E_m$, which give a mean value for each dispersion. The greater the slope of a line passing through the origin at $E_c/E_m = 1$, the more effective the treatment may be regarded in creating a tight bond at the mica-matrix interface. The slope of a line is indicative of the rigidity of the resulting composites. In Table 3, the composites are ranked in order from most rigid to most compliant, based on the slopes of their $E_c/E_m$ plots.

TABLE 3
RANKING CHEMICAL TREATMENTS THROUGH THEIR EFFECT ON FLEXURAL MODULUS

| Example | Solid | Rank | Slope |
|---------|-------|------|-------|
| 2 | B | 1 | 16.9 |
| 6 | D | 1 | 16.9 |
| 1 | A | 2 | 13.3 |
| 3 | C | 2 | 13.3 |
| — | As rec'd | 2 | 13.3 |
| 13 | K | 3 | 11.3 |

TABLE 3-continued

| RANKING CHEMICAL TREATMENTS THROUGH THEIR EFFECT ON FLEXURAL MODULUS | | | |
|---|---|---|---|
| Example | Solid | Rank | Slope |
| 14 | L | 3–4 | 11.3–6.9 |

Two variables which influence mechanical properties of a flake reinforced composite are (1) the effective aspect ratio for the overall dispersion of flakes, and (2) the degree of adhesion at the matrix-filler interface. By a mathematical analysis which utilizes flexural modulus data taken from a homologous series of composites, one can derive two parameters, $\alpha$ and $\beta$, representing the effective aspect ratio of a dispersion and slip resistance of the polymer matrix parallel to the interface, respectively.

Making use of a modification of Riley's theory of parallel plate reinforcement, a known volume fraction of mica, and measured elastic moduli, one may calculate a single parameter $\Omega$, which can be shown to be related to the above parameters by the formula:

$$\Omega = 2\alpha^{\frac{3}{2}}\beta^{\frac{1}{2}}$$

Provided one member of a homologous series of composites has nearly perfect adhesion, one may assume $\beta = 1$ for that composite, and calculate $\alpha$ for the dispersion. Knowing $\alpha$, one then proceeds to calculate $\beta$ values for the other members of the group.

The slip resistance $\beta$ of the polymer matrix at the interface with the reinforcing flakes was determined for a high impact polystyrene matrix containing 3.4% by volume of each of the following: mica flakes chemically modified in accordance with this invention by co-valently bound S-B-S block copolymer 0–1; the same mica as received; and the same mica flakes coated by precipitation from solution with 10 and 20% by weight of the same block copolymer employed in the chemically modified mica. The results are shown in Table 4.

It is seen from the $\beta$ values in Table 4 that chemical bonding of a block copolymer to the mineral substrate is greatly superior in providing a tight linkage between reinforcement and matrix to coating of the same mineral reinforcement with the same block copolymers.

TABLE 4

| Reinforcing Composition | $\beta$ | $\alpha$ |
|---|---|---|
| Mica as received | 0.63 | 126 |
| Mica with about 0.1% w block copolymer co-valently bonded | 1.00[a] | 121 |
| Mica coated with 10% block copolymer | 0.66 | 126 |
| Mica coated with 20% block copolymer | 0.79 | 126 |

[a] by definition, as explained in text.

In studies of the effect on impact strength of adding from about 3 to about 7.5% of "as received" mica flakes to HIPS matrix P-4, it was found that, as expected, impact strength decreased with increasing amounts of filler—from 1.5 ft-lb/inch of the matrix itself to about 0.6 ft-lb/inch with about 7.5% filler, but the decrease was independent of the size of the mica flakes—from 60 to 320 mesh.

FIG. 1 is a plot of notched Izod impact vs. volume percent reinforcing composition.

In each case the matrix was a commercial high impact polystyrene (P-4). The solid mineral substrate was mica.

Line I of FIG. 1 shows the effect of untreated mica. Increasing amounts caused a continuous decrease in impact resistance.

Line II represents the effect of using a treated mica of the type prepared in Example 1 (Solid A). Increasing amounts still caused a steady decrease in impact resistance, but at a lower rate than untreated mica. Deposition of additional block copolymer on the mica treated as in Example 1 (Examples 12 and 13) resulted in some further improvement in impact resistance.

Lines III, IV and V demonstrate still greater improvements in impact resistance, obtained with mica treated as in Examples 2, 6 and 4, respectively. Lines IV and V demonstrate that with amounts of these reinforcements up to about 2 and about 5%, respectively, the impact resistance is better than that of the polymer matrix itself.

It will be recalled that it had been found that when using "as received" mica, the decrease in impact strength due to added filler was not affected by size difference from normal 60 to 320 mesh. This is apparently not true for reinforcement treated according to this invention. Lines V, V' and V" represent mineral substrates of 60 mesh, 200 mesh and 320 mesh, treated in the same manner with the same block copolymer (Examples 4, 3 and 5). The 60 mesh reinforcement is clearly superior, although each is superior to untreated mica.

FIG. 2 is a plot of notched Izod impact vs. flexural modulus (an indicator of stiffness) for a number of filled compositions.

In each case, the polymer matrix was a commercial high impact polystyrene (P-4). In each case, the mica used was M-1 and the glass fiber M-4.

Line I of FIG. 2 shows the effect of addition of untreated mica or untreated glass fibers. Increasing amounts caused a continuous decrease in impact resistance as stiffness increased. The concave shape of the curve shows that the smaller amounts of untreated mica or glass are especially effective in causing reduction in impact.

Line II represents the effect of using a mica of the type prepared in Example 1. Increasing amounts still caused a steady decrease in impact resistance with increasing stiffness, but at a lower rate than the untreated mica. The line is straight and lies above the line for untreated mica, except at its lowest point.

Line III represents the results of using a mica of the type prepared in Examples 2, 6 and 7, and of glass fibers of the type prepared in Example 8. Such treated reinforcement, used at low concentrations, permit production of significantly stiffened polymer without loss of impact strength and even with a slight gain.

In the preparation according to Examples 1, 7 and 8, S-B-S block copolymer was a commercial polymer of somewhat higher molecular weight than S-B-S compound 0–1. It was a nominally about 16,000–69,00-16,000 polymer.

Line IV shows a significant increase in impact strength when using a reinforcement of the type prepared in Example 3 (but using mica substrate M-1, as in the other mica reinforcement of FIG. 2) in a concentration of 1.5%; some increase in impact is observed at a loading of 3.4%. The flexural modulus of the composite can be increased to 500,000 psi before the impact strength decreases below that of the unfilled polymers.

FIG. 3 is a plot of the ratio of the flexural modulus of reinforced composites ($E_c$) to the flexural modulus of several unreinforced polymer matrices ($E_m$). The several lines represent different volume fractions (0%, 1.5%, 3.4% and 8%) of the same reinforcement (of the type of Solid C') in different polymer matrices (P-2, P-3, P-4, P-5 and P-6).

Table 5 shows mechanical properties of injection molded polypropylene homopolymer (P-1) with and without the grafted reinforcements of this invention. The homopolymer itself at room temperature has a notched Izod impact of 0.42 ft/lbs and a flex modulus of 190,000 psi. Adding untreated mica raises the flex modulus to about 510,000 lbs and lowers the Izod impact strength to 0.34 ft/lbs. In contrast, if mica with S-B-S copolymer 0-1 grafted to the surface, as prepared in Example 1, is blended with the polypropylene at the same volume percent level, the modulus is 460,000 lbs. per square inch, almost as good as the untreated mica, but the imact strength 0.52 ft/lbs, represents an increase over the homopolymer as well as a significant increase over the results with the untreated mica. Since the mica was present in each sample at 5% volume level, but in the case of the grafted mica some weight of the reinforcement was made up by the graft organic materials, the amount of mineral actually used was slightly less in the treated than in the untreated mica. This accounts for most of the decrease in stiffness relative to untreated mica.

TABLE 5

MECHANICAL PROPERTIES OF PP/MICA COMPOSITES

| Reinforcement Type* | Flex Modulus 10⁵ psi | Tensile** Modulus 10⁵ psi | Tensile Strength psi | Notched Izod Impact ft-lb/in. 75° F. | Notched Izod Impact ft-lb/in. −40° F. |
|---|---|---|---|---|---|
| None | 1.9 | 2.1 | 3740 | 0.42 | 0.31 |
| Untreated Mica | 5.1 | 4.2 | 3850 | 0.34 | 0.28 |
| Example 1 | 4.6 | 4.2 | 3890 | 0.52 | 0.34 |

*Mica present at 5% volume levels.
**Tensile properties determined at 0.05 in./min; flex modulus determined at low stress levels under static load.

What is claimed is:

1. A reinforced thermoplastic composition comprising a thermoplastic polymer matrix having intimately distributed therein a chemically modified mineral reinforcing component, wherein said matrix is a non-elastomeric thermoplastic poly(vinylarene) and said reinforcing component is a particulate or filamentary mineral polymer-reinforcing material having chemically bonded to its surface by covalent chemical bonding a thin layer averaging about 5-500 Angstrom in thickness of silicon-free and heavy metal-free organic molecules which contain at least a substantial segment capable of interacting with said matrix polymer to provide improved adhesion, said segment having an average molecular weight at least about one-sixth that of said matrix polymer.

2. A composition according to claim 1 wherein said polymer matrix is a polymer of styrene.

3. A composition according to claims 1, or 2 wherein said mineral reinforcing material is glass, mica, vermiculite, asbestos, talc, clay, silica gel, alumino-silicate or silica and is present in a concentration of 1-30 parts by weight per 100 parts of the matrix polymer.

4. A composition according to claims 1, or 2 wherein said mineral reinforcing material is a platy material of the group consisting of mica, asbestos, talc and clay, having an aspect ratio in the range from 20-200, and is present in a concentration of 1-30 parts by weight per 100 parts of the matrix polymer.

5. A composition according to claims 1, or 2 wherein said chemical bonding consists of covalent

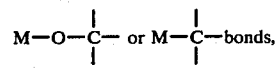

wherein M represents silicon, aluminum or other metals of groups 2 to 8 of the Periodic Table; M and O are components of the surface layer of said mineral material; and C is a component of said organic molecules, connected to at least one polymer-interactive group.

6. A composition according to claims 1, or 2 wherein said chemical bonding results from reaction between surface oxygen or hydroxyl groups of said mineral component and double bonds of said organic molecules.

7. A composition according to claims 1, or 2 wherein said chemical bonding consists of

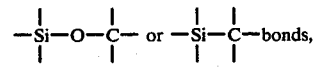

wherein Si and O are components of the surface layer of said mineral material and C is a component of said organic molecules.

8. A composition according to claim 5 wherein said mineral reinforcing material is a platy material of the group consisting of mica, asbestos, talc and clay, having an aspect ratio in the range from 20-200, and is present in a concentration of 1-30 parts by weight per 100 parts of the matrix polymer.

9. A composition according to claim 6 wherein said mineral reinforcing material is a platy material of the group consisting of mica, asbestos, talc and clay, having an aspect ratio in the range from 20-200, and is present in a concentration of 1-30 parts by weight per 100 parts of the matrix polymer.

10. A composition according to claim 7 wherein said mineral reinforcing material is a platy material of the group consisting of mica, asbestos, talc and clay, having an aspect ratio in the range from 20-200, and is present in a concentration of 1-30 parts by weight per 100 parts of the matrix polymer.

11. A reinforced thermoplastic composition comprising a thermoplastic polymer matrix having intimately distributed therein a chemically modified mineral reinforcing component, wherein said matrix is a non-elastomeric thermoplastic organic polymer and said reinforcing component is a particulate or filamentary mineral polymer-reinforcing material having chemically bonded to its surface by covalent chemical bonding a thin layer averaging about 5-500 Angstrom in thickness of silicon-free and heavy metal-free organic molecules which contain at least a substantial segment capable of interacting with said matrix polymer to provide improved adhesion, said segment having an average molecular weight at least about one-sixth that of said matrix polymer, and said chemical bonding resulting from reaction between surface oxygen or hydroxyl groups of said mineral component and double bonds of said organic molecules.

12. A composition according to claim 11 wherein said polymer matrix is a polyolefin or poly(vinylarene).

13. A composition according to claim 11 wherein said polymer matrix is a propylene polymer.

14. A composition according to claim 11 wherein said polymer matrix is a polymer of 1-butene.

15. A composition according to claim 11 wherein said polymer matrix is a polymer of styrene.

16. A composition according to claim 11 wherein said mineral reinforcing material is glass, mica, vermiculite, asbestos, talc, clay, silica gel, alumino-silicate or silica and is present in a concentration of 1–30 parts by weight per 100 parts of the matrix polymer.

17. A composition according to claim 16 wherein said mineral reinforcing material is a platy material of the group consisting of mica, asbestos, talc and clay, having an aspect ratio in the range from 20–200, and is present in a concentration of 1–30 parts by weight per 100 parts of the matrix polymer.

* * * * *

UNITED STATES PATENT AND TRADEMARK OFFICE
CERTIFICATE OF CORRECTION

PATENT NO. : 4,405,727

DATED : September 20, 1983

INVENTOR(S) : Thomas F. Brownscombe

It is certified that error appears in the above-identified patent and that said Letters Patent is hereby corrected as shown below:

The sheets of drawings consisting of Figures 1, 2 and 3, should be added as per attached sheets.

Signed and Sealed this

Nineteenth Day of March 1985

[SEAL]

Attest:

DONALD J. QUIGG

Attesting Officer     Acting Commissioner of Patents and Trademarks

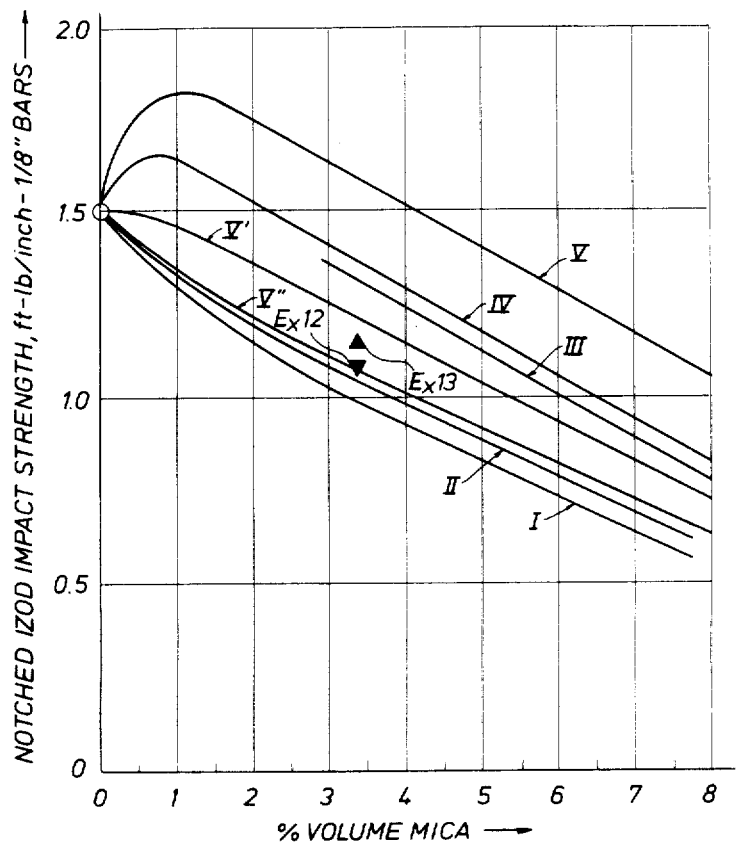
FIG.1 EFFECT OF REINFORCEMENTS ON NOTCHED IZOD IMPACT STRENGTH
| LINE | SOLID | SOLID SUBSTRATE | ORGANIC COMPOUND | SOLID PREPARED AS IN EXAMPLE NO. |
|---|---|---|---|---|
| O | - | - | - | - UNREINFORCED MATRIX |
| I | - | MICA | - | - UNTREATED MICA |
| II | A | MICA | S-B-S | 1 |
| III | B | MICA | PS | 2 |
| IV | D | MICA | B-S, TAPERED | 6 |
| V | C' | MICA | S-(SB)-B-(BS)-S | 4 |
| V' | C | MICA | S-(SB)-B-(BS)-S | 3 |
| V" | C" | MICA | S-(SB)-B-(BS)-S | 5 |

FIG. 2 IMPACT-STIFFNESS BALANCE IN HIGH IMPACT POLYSTYRENE MATRIX
NUMERALS NEXT TO DATA POINTS INDICATE VOLUME PERCENT OF REINFORCING COMPOSITION.

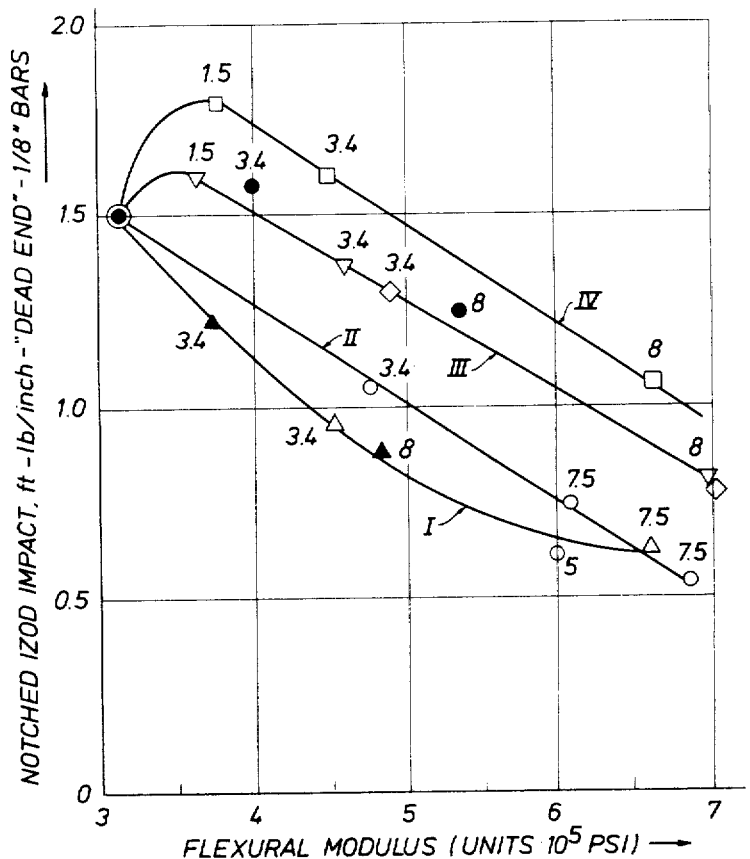

| | LINE | SOLID | SOLID SUBSTRATE | ORGANIC COMPOUND | SOLID PREPARED AS IN EXAMPLE NO. | |
|---|---|---|---|---|---|---|
| ◉ | - | - | - | - | - | UNREINFORCED MATRIX |
| △ | I | - | MICA | - | - | UNTREATED MICA |
| ▲ | I | - | GLASS | - | - | UNTREATED GLASS FIBER |
| ○ | II | A | MICA | S-B-S | 1 | |
| ◇ | III | B | MICA | POLYSTYRENE | 2 | |
| □ | IV | C' | MICA | S-(SB)-B-(BS)-S | 4 | |
| ▽ | III | D | MICA | B-S, TAPERED | 6 | |
| ● | III | F | GLASS | S-B-S | 8 | |